Aug. 26, 1930.    M. MARTENSON    1,774,027
COMBINED SCOOP AND SHOVEL
Filed April 20, 1929
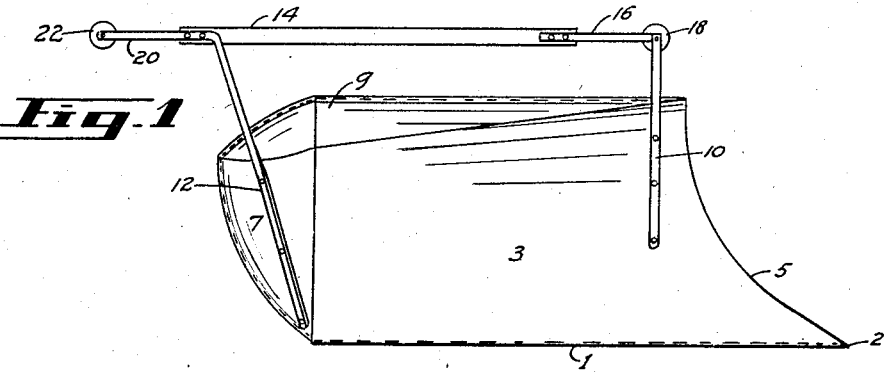
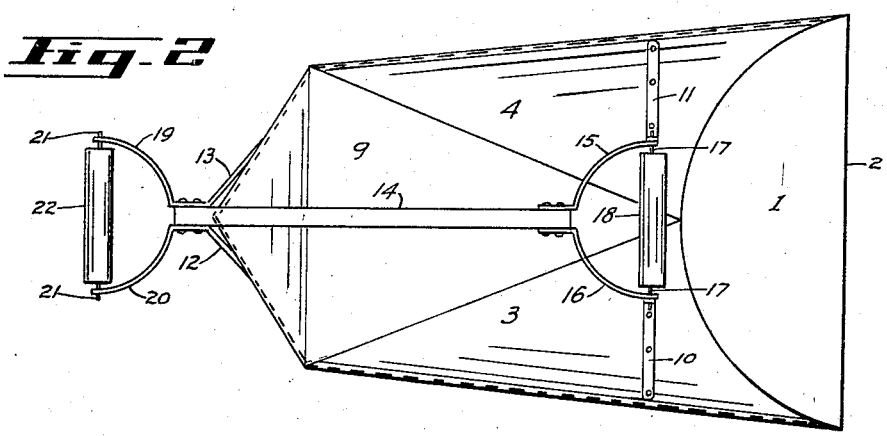
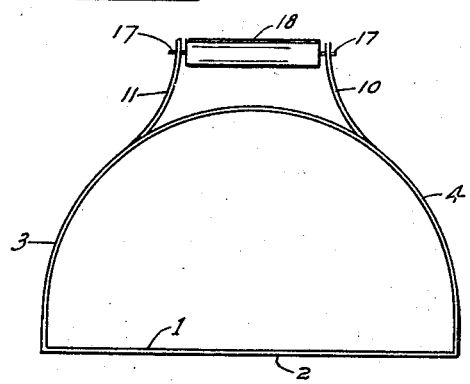
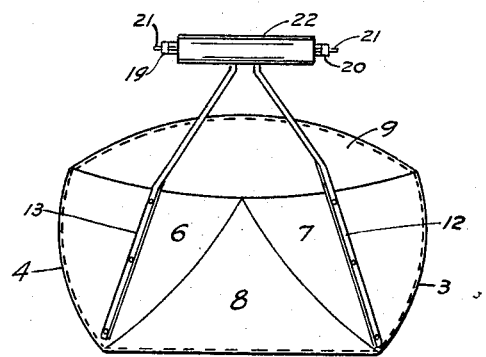
Inventor:
Marten Martenson
per
John W Mitchell
Attorney Patented Aug. 26, 1930

1,774,027

UNITED STATES PATENT OFFICE

MARTEN MARTENSON, OF WILLOWBROOK, SASKATCHEWAN, CANADA

COMBINED SCOOP AND SHOVEL

Application filed April 20, 1929, Serial No. 356,772, and in Canada May 1, 1928.

My invention relates to shovels having particular reference to shovels for use in handling grain and like products, the object of my invention being to provide a semi-enclosed shovel of large capacity with balanced double hand grip attachments adjusted to apply the lifting power evenly relative to the point of balance of the shovel to permit an increase in its capacity without a corresponding increase in effort required for its operation.

A further object of my invention is to provide a shovel of large capacity adaptable for either transferring materials on a horizontal plane or for elevating the materials for loading purposes and formed to minimize spilling the contents during the operation.

With the above and other objects in view my invention resides in the combination of parts hereinafter designated and claimed in the amended claims, reference also being had to the accompanying drawings wherein like characters of reference are used to indicate like parts throughout the several views and wherein:—

Fig. 1 is a side elevation of the device assembled.

Fig. 2 is a top plan view of same.

Fig. 3 is a front elevation of the device.

Fig. 4 is a rear elevation of same.

The device consists of a semi-enclosed, preferably sheet metal, body, open at the front and comprising a flat blade or bottom portion 1 provided with a straight edged front 2. To the bottom 1 are attached curved upwardly and inwardly extending triangular shaped sides 3 and 4 formed with a curved recession at the front as indicated at 5. To the rear edge of the bottom portion is attached the centre section 8 of the heel or back portion which combines with sections 6 and 7 connected thereto, and to the sides 3 and 4, to form a curved back for the shovel. The top of the body is enclosed by a cover 9 which is rounded to form connection with the sections 6 and 7 and forwardly angled and connected with the sides 3 and 4.

Forwardly attached to the sides 3 and 4 are upwardly extending connecting rods 10 and 11 relatively aligned and converging in accordance with the angle of inclination of the said sides, bolts or similar means of attachment being employed. To the rear sections 6 and 7 are similarly attached further upward extending connecting rods 12 and 13, convergingly inclined, the spacing and relative positioning of the said connecting rods being adjusted relative to the balance of the body portion.

The mutual connecting of the said connecting rods is derived through a handle attachment which consists of a bar 14 to the forward end of which is oppositely attached a pair of curved diverging arms 15 and 16, the extremities of the said arms being united with the upper extremities of the connecting rods 10 and 11. Laterally disposed between the extremities of the arms 15 and 16 is a pin 17 on which is rotatably mounted on hand grip 18.

To the rear extremity of the bar 14 is attached a further similar pair of arms 19 and 20 divergingly extending rearward from the extremity of the said bar 14 and connected at their point of attachment therewith with the upper extremities of the connecting rods 12 and 13 and having similarly laterally disposed between the outer extremities thereof a pin 21 on which is rotatably mounted a hand grip 22.

In using the device the grips 21 and 22 are gripped by the hands and a straight arm lifting and bent arm leverage power applied. Such application of a balance double grip permitting of a considerable quantity of grain or other material being handled in excess of what could be handled with an ordinary shovel the enclosure of the body serving to retain the material without spilling.

Having thus described my invention, what I claim is:—

1. The combination with a shovel of a handle attachment therefor comprising a bar, diverging pairs of arms attached to the extremities of said bar, hand grips rotatably mounted on said arms and connecting rods forwardly and rearwardly connecting said attachment to said shovel.

2. The combination with a shovel of a handle attachment therefor comprising a bar, a pair of arms attached to the forward extremity thereof, and divergingly extending therefrom, a hand grip rotatably mounted between said arms, connecting rods attaching the extremities of said arms to said shovel, a further pair of arms attached to the rear extremity of said bar and divergingly extending therefrom, a hand grip rotatably mounted between said arms and connecting rods attaching the rear extremity of said bar to said shovel.

3. The combination with a shovel of a handle therefor comprising a connecting bar, pairs of arms divergingly extending from the extremities of said bar, pins mounted between the extremities of said arms, grips rotatably mounted on said pins, and connecting rods forwardly and rearwardly connecting said handle to said shovel.

4. The combination with a shovel comprising an enclosed body open at the forward end thereof of a handle therefor comprising a bar, arms divergingly extending from the extremities of said bar, pins mounted between the extremities of said arms, grips rotatably mounted on said pins and connecting rods forwardly and rearwardly attaching said handle to said shovel.

5. The combination in a shovel of a body comprising a blade, upwardly and inwardly extending sides attached to said blade, a curved heel attached to said blade and said sides, a cover connecting with said sides and heel, and a handle attachment therefor comprising a connecting bar, arms divergingly extending from the extremities of said bar, grips rotatably mounted on said arms and connecting rods connecting said handle attachment to said body.

6. The combination in a shovel of a body comprising an edged blade, receding sides upwardly and inwardly extending from said blade, a heel connecting with said sides and blade, a cover attached to said sides and heel and a handle attachment for said body comprising a bar, arms divergingly extending from the extremities of said bar, pins mounted between the extremities of said arms, hand grips rotatably mounted on said pins and connecting rods forwardly and rearwardly attaching said handle attachment to said body.

MARTEN MARTENSON.